Dec. 2, 1969  J. W. E. WHITRIGHT  3,482,203
ELECTRICAL CONNECTOR STORING DEVICE FOR MOTOR VEHICLE TRAILERS
Filed Feb. 19, 1968
FIG. 1.
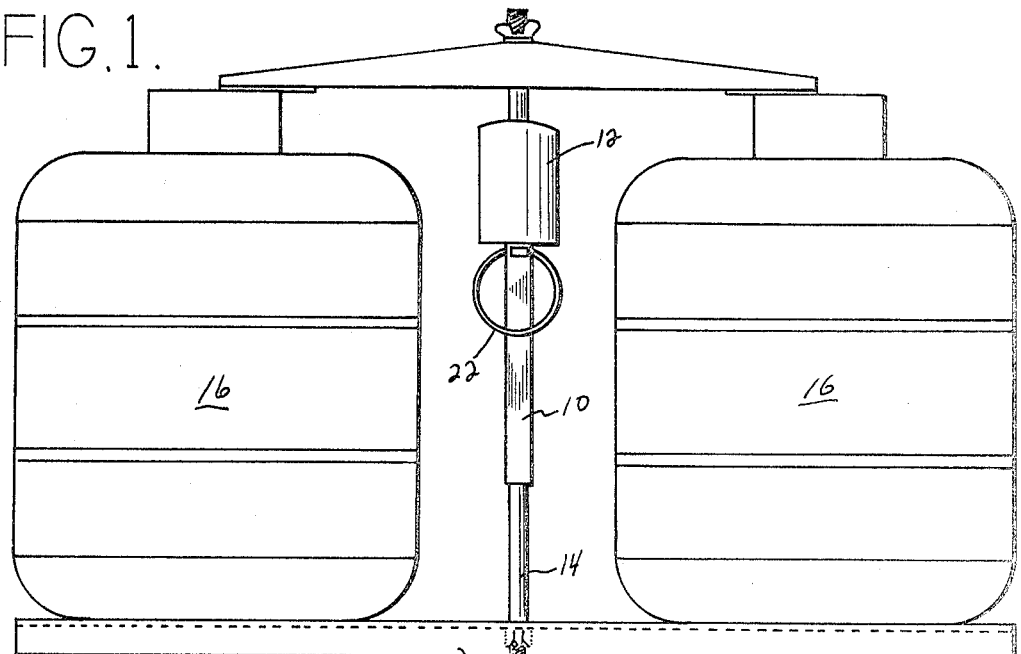
FIG. 2.
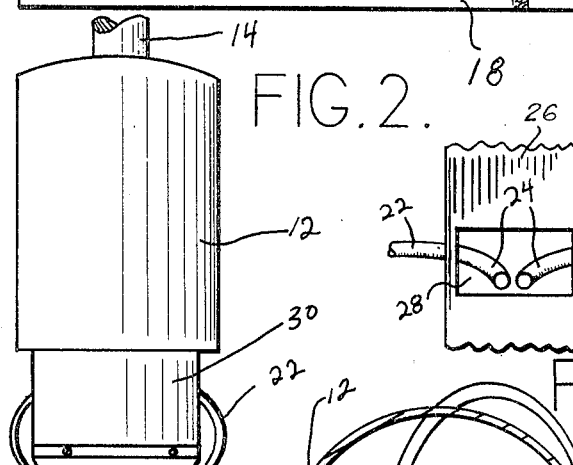
FIG. 3.
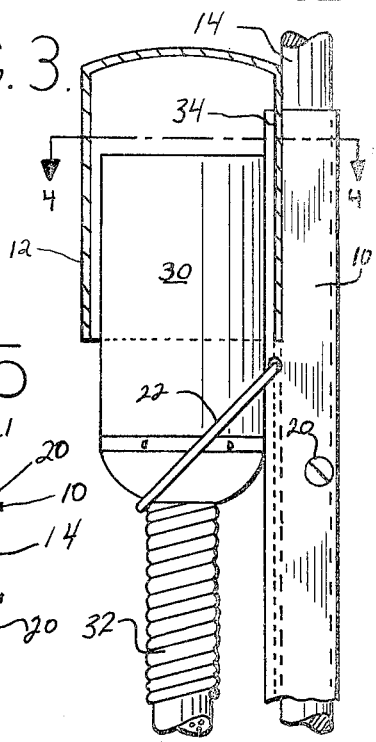
FIG. 4.
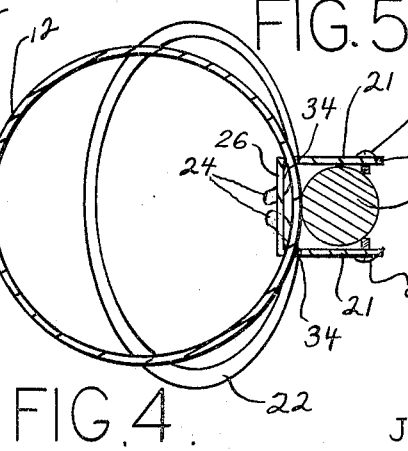
FIG. 5
INVENTOR
JOSEPH W. E. WHITRIGHT
BY Steward & Steward
his ATTORNEYS.

United States Patent Office 3,482,203
Patented Dec. 2, 1969

3,482,203
ELECTRICAL CONNECTOR STORING DEVICE
FOR MOTOR VEHICLE TRAILERS
Joseph W. E. Whitright, Cheshire, Conn., assignor to
Cheshire Manufacturing Co., Inc., Cheshire, Conn., a
corporation of Connecticut
Filed Feb. 19, 1968, Ser. No. 706,350
Int. Cl. H01r 13/44
U.S. Cl. 339—36                                    4 Claims

ABSTRACT OF THE DISCLOSURE

A device for storing and protecting an electrical plug on a trailer when disconnected from the motor vehicle by which the trailer is drawn, in which an inverted hood is provided on a mounting channel that is attached to a fixed portion of the trailer. A bail or ring pivoted to the mounting channel below the open end of the inverted hood provides means for suspending the plug within the hood when the plug is inserted upward through the ring into the hood.

---

This invention relates to devices for storing and protecting an electrical connector for a motor vehicle trailer when the connector is disconnected, and it relates more particularly to a device of this nature which is mounted on the trailer near the tongue by which it is drawn, so that when the trailer is disconnected from the car or truck and the electrical connection is broken, the connector on the trailer can be hung up within a protective hood to prevent water and dirt from fouling the contacts.

Various devices have been provided for storing the electrical connector-plug at the trailer when the connection is broken, most of which however are expensive and can be used with only one type or size of electrical plug. It is an object of the present invention to provide a device of this nature which is inexpensive and will work for various different sizes and shapes of plugs, including those having handles that extend outward from the sides of the plug body, by which the plug may be grasped in order to disconnect it from the mating plug or socket on the automobile or truck. Such a device must, therefore, be simple in design so that it is easy to manufacture and practically foolproof in use.

A protective hood and storage device embodying the present invention includes an elongated channel-shaped mounting member by which it is supported on a suitable fixed part of the trailer, such as the vertical hold-down rod for the propylene gas tanks. A hollow hood member is fixed to the upper end of the mounting member with the open end of the hood facing downward when the device is mounted on the trailer. A bail, such as a wire ring, is pivoted on the mounting member just below the open end of the hood, so that it swings between a generally vertical position along the mounting member to a generally horizontal position below the hood. When the electrical connection is broken between the trailer and the automobile, the connector at the trailer is inserted upwardly through the wire bail into the inverted hood with the wire or cable extending down from the rear of the plug, which is held up within the hood by the bail due to the tendency for the bail to swing back down against the mounting member. In most cases the plug has a rear end surface or flange on which the outer section of the bail catches, preventing the plug from falling out. In others, handles on the plug can be inserted up through the bail, and these handles then prevent the bail from slipping off. In any event the tendency of the bail to hold the plug as it swings downward under its own weight and under the weight of the plug provides sufficient gripping force to prevent the plug from falling to the ground and to hold it up inside the hood where it is protected from the weather, mud or other elements which may damage it.

One embodiment of the invention is illustrated in the accompanying drawings, wherein:

FIG. 1 is a front view of a typical gas tank installation at the front end of a trailer, where the plug-protecting and storage device of the present invention is shown mounted;

FIG. 2 is a front view of the device on a larger scale, an electrical connector-plug being shown supported within the hood by the retaining bail;

FIG. 3 is a side view of the unit with the hood shown in vertical section;

FIG. 4 is an enlarged horizontal section taken on the line 4—4 of FIG. 3 with the connector-plug removed; and FIG. 5 is a greatly enlarged front detail view of a portion of the mounting member, showing how the bail is attached thereto.

The device of the present invention consists of a length of metal channel 10, at one end of which is fastened a cylindrical hood 12 with its open end facing toward the opposite end of channel 10. The channel 10 is readily mounted in a vertical position on any suitable part of the trailer (not shown) with the open end of the hood 10 facing down. Thus, as shown in FIG. 1, the mounting channel 10 is fastened to a hold-down rod 14 for the gas supply tanks 16, 16, which are mounted on a tray 18 on the tongue (not shown) of the trailer. Or if desired, it may be attached to the vertical shaft of the draw-bar jack on the trailer. In the example shown in the drawings, the mounting channel is large enough to fit around the rod 14 and is rigidly held in place by a pair of inwardly extending set-screws 20, 20 (FIGS. 3 and 4) which are threaded into the opposite side flanges 21, 21 of the U-shaped channel 10.

Pivoted just below the lower open end of the hood 12 is a circular plug-retaining bail 22 made of relatively stiff wire, the ends 24, 24 (FIG. 5) of which fit through holes in the side flanges of channel 10. It will be noted that the ends 24, 24 pass through the side flanges just in back of the web portion 26 of channel 10 so that they do not interfere with the rod 14, on which the device is mounted. The ends 24, 24 are also bent inwardly of the bail 22 inside the channel 10, in order to secure the bail in place. Due to the close proximity of the ends of bail 22 to the web 26 of channel 10, a clearance opening 28 is provided in web 26 where the bail is fastened, thus allowing the inturned ends 24, 24 of the bail to move freely through the opening 28 in the web when the bail is swung upwardly to its horizontal position. It will be noted that without such opening 28, the ends 24, 24 would bind against the web 26 and prevent the bail from pivoting.

As shown in FIGS. 2 and 3, a conventional connector-plug 30 for the electrical supply cable 32 on the trailer is inserted upwardly through the bail into the lower, open end of the hood 12, with the outermost portion of the bail fitting under the lower end of the plug 30. In this position the bail 22 holds the plug securely in place until the plug is to be used again in making the connection to the car or truck when hauling the trailer. Even if the bail can not reach below the end of an unusually long-bodied plug, it will still grip the sides of the plug, due to its tendency to swing down and to the weight of the plug and electrical cable, and prevent the plug from slipping free. Moreover, most plugs have some hand-grip portion by which it is grasped when being disconnected from the mating part on the car. The bail will therefore fit around such hand-grip portion so that the plug is securely hung inside the protective hood 12 while it is not being used. In order to remove the plug, the bail 22 is lifted up to its horizontal position and the plug is free to slide out below.

The hood 12 is desirably made of a suitable plastic or other non-conductive material so that if the connector-plug 30 has exposed electrical contacts, these will not make electrical contact should they engage the inner surface of the hood. As will be seen by referring to FIGS. 3 and 4, hood 12 is supported on the mounting channel 10 within opposed slots 34, 34 cut lengthwise through the flanges 21, 21 from the upper end of the channel and immediately in back of its web 26. Slots 34, 34, which extend down almost to the point where bail 22 is pivoted to the channel, are just wide enough to receive and snugly hold the cylindrical wall of hood 12, so that it is mounted firmly thereon. If desired, a suitable cement may be applied along the line where the wall of the hood fits through slots 34, 34 in order to ensure that the hood is rigid with the mounting channel. It will be noted that this way of attaching the hood to the mounting channel provides a simple, sturdy construction, while at the same time taking up only slightly more space within the channel than that used by the ends 24, 24 of the bail. Consequently, neither the wall of the hood nor the ends of the bail prevent the rod 14 from being fully encompassed by the side flanges 21, 21 of the mounting channel so that the set-screws 20, 20 can be tightened down to hold the device securely in place.

What is claimed is:

1. A protective hood and storage device for an electrical connector for a motor vehicle trailer when not in use, which comprises in combination an elongated mounting channel by which said device is fixed to a suitable portion of the trailer with the longitudinal axis of said mounting channel disposed substantially vertical and having means for fastening it to the trailer, a hollow hood member, having one end closed and the opposite end open, rigidly fixed on said mounting channel such that said open end is disposed downward when the device is mounted on the trailer, and a bail member pivotally connected at its periphery to said mounting channel adjacent the open end of said hood member for pivotal movement between a substantially vertical position along said mounting channel and a horizontal position below said hood member for holding an electrical connector within said hood member when the connector is inserted upwardly through said bail member into the open end of said hood member.

2. A device as defined in claim 1, wherein said mounting channel is U-shaped with opposite parallel side flanges extending from a central web, said side flanges having slots extending longitudinally from one end of said mounting channel adjacent said web, said hood member having a wall fitted within said slots such that said flanges engage and support the outer surface of said wall while said web engages and supports the inner surface of said hood member, thereby rigidly fixing said hood member onto said mounting channel.

3. The combination defined in claim 2, wherein said fastening means for mounting said device comprises a pair of opposed set-screws threaded inwardly through said flanges for engagement with an elongated vertical member on the trailer around which said mounting channel is placed.

4. The combination as defined in claim 2, wherein said bail member is a ring formed from relatively stiff wire having its ends extending through opposed holes in said side flanges of said mounting channel in close proximity with said web, said ends being bent inwardly of said ring toward said web and said web having a clearance opening adjacent said opposed holes in said flanges so that the bent ends of said wire ring can move freely through said clearance opening when said bail member is provided to its horizontal position.

References Cited

UNITED STATES PATENTS 3,176,257  3/1965  Introvigne _____ 339—38

FOREIGN PATENTS 509,276  11/1928  Germany.

MARVIN A. CHAMPION, Primary Examiner

JOSEPH H. McGLYNN, Assistant Examiner

U.S. Cl. X.R.

174—135; 211—66; 248—111, 314; 280—422; 339—10